(12) United States Patent
Wiebe

(10) Patent No.: US 8,978,389 B2
(45) Date of Patent: Mar. 17, 2015

(54) RADIAL INFLOW GAS TURBINE ENGINE WITH ADVANCED TRANSITION DUCT

(75) Inventor: David J. Wiebe, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 567 days.

(21) Appl. No.: 13/326,392

(22) Filed: Dec. 15, 2011

(65) Prior Publication Data

US 2013/0152543 A1 Jun. 20, 2013

(51) Int. Cl.
 F02C 1/00 (2006.01)
 F02C 3/04 (2006.01)
 F02C 3/00 (2006.01)

(52) U.S. Cl.
 USPC ............................... 60/805; 60/752; 60/39.37

(58) Field of Classification Search
 USPC .................. 60/752–760, 39.37, 805
 See application file for complete search history.

(56) References Cited

U.S. PATENT DOCUMENTS

| | | | |
|---|---|---|---|
| 2,821,067 A * | 1/1958 | Hill .............................. | 60/805 |
| 3,238,718 A | 3/1966 | Hill | |
| 3,269,120 A * | 8/1966 | Sabatiuk ...................... | 60/39.43 |
| 3,657,884 A * | 4/1972 | Hugoson ...................... | 60/39.55 |
| 3,782,108 A * | 1/1974 | Holste .......................... | 60/793 |
| 3,907,457 A * | 9/1975 | Nakamura et al. ........... | 415/112 |
| 4,081,957 A | 4/1978 | Cox, Jr. | |
| 4,177,638 A | 12/1979 | Wood | |
| 5,061,154 A | 10/1991 | Kington | |
| 5,074,111 A * | 12/1991 | Harris et al. ................ | 60/39.37 |
| 7,628,018 B2 | 12/2009 | Mowill | |
| 7,836,677 B2 | 11/2010 | Bland | |
| 7,958,734 B2 | 6/2011 | Paprotna et al. | |
| 8,701,416 B2 * | 4/2014 | Teets ............................. | 60/754 |
| 2010/0064693 A1* | 3/2010 | Koenig et al. ................. | 60/760 |
| 2010/0077719 A1 | 4/2010 | Wilson et al. | |
| 2011/0203282 A1 | 8/2011 | Charron et al. | |

FOREIGN PATENT DOCUMENTS

EP 1722069 A1 11/2006
JP H02196136 H 8/1990

* cited by examiner

*Primary Examiner* — Gerald L Sung

(57) ABSTRACT

A gas turbine engine (10), including: a turbine having radial inflow impellor blades (38); and an array of advanced transition combustor assemblies arranged circumferentially about the radial inflow impellor blades (38) and having inner surfaces (34) that are adjacent to combustion gases (40). The inner surfaces (34) of the array are configured to accelerate and orient, for delivery directly onto the radial inflow impellor blades (38), a plurality of discrete flows of the combustion gases (40). The array inner surfaces (34) define respective combustion gas flow axes (20). Each combustion gas flow axis (20) is straight from a point of ignition until no longer bound by the array inner surfaces (34), and each combustion gas flow axis (20) intersects a unique location on a circumference defined by a sweep of the radial inflow impellor blades (38).

19 Claims, 3 Drawing Sheets

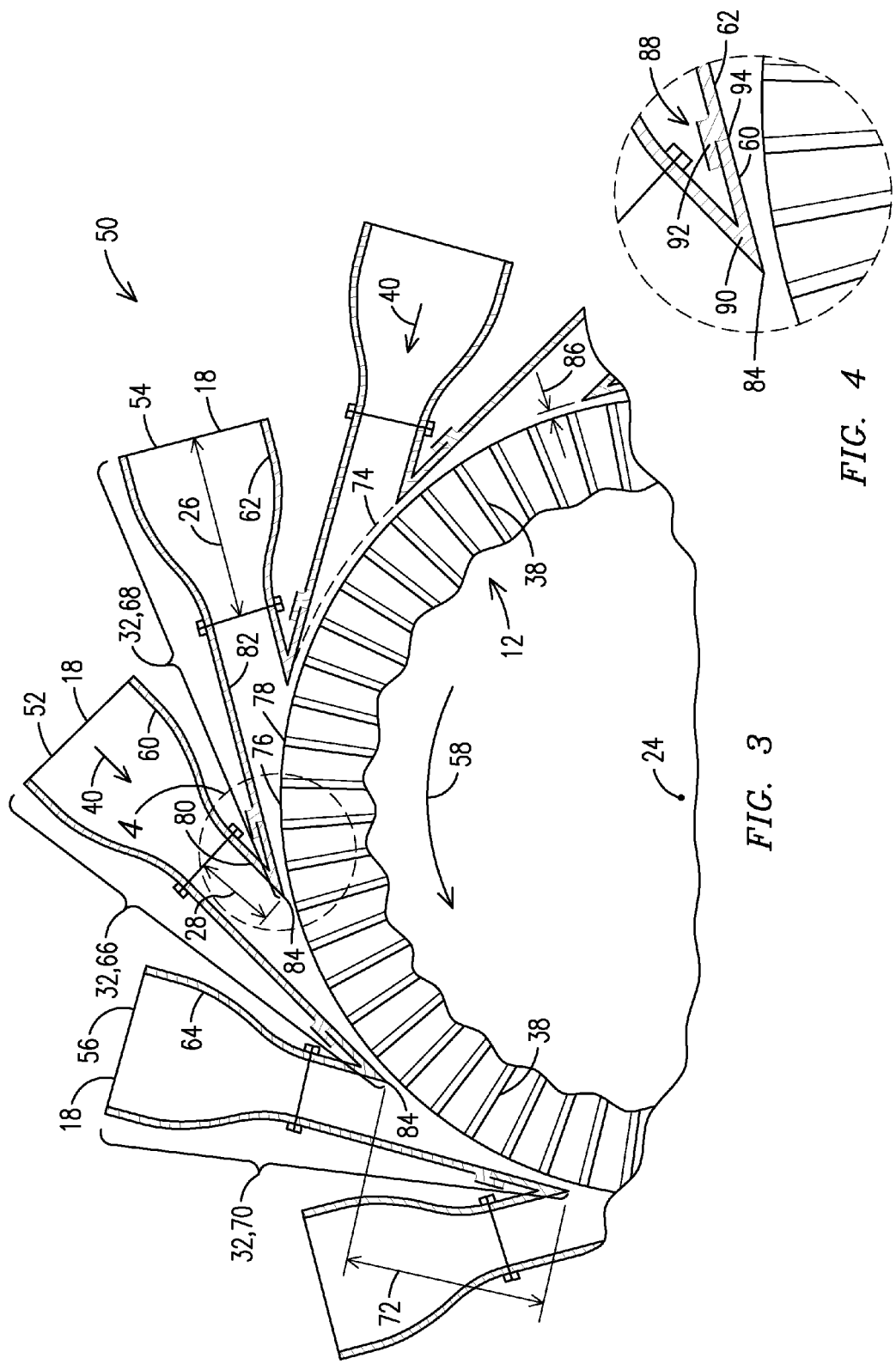

RADIAL INFLOW GAS TURBINE ENGINE WITH ADVANCED TRANSITION DUCT

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

The invention relates to radial inflow gas turbine engines. In particular the invention relates to radial inflow gas turbine engines that utilize advanced transition combustion assemblies that do not utilize a first row of turbine vanes to accelerate combustion gases.

BACKGROUND OF THE INVENTION

Radial inflow gas turbine engines may have a turbine that uses an impeller to receive combustion gases from combustors and associated conventional transition ducts. The combustion gases rotate the impeller as the impeller directs the flow of combustion gases from a radially inward direction to an axial direction. Due to the nature of combustors and conventional transitions the combustion gases may be properly oriented by a first row of vanes disposed between an outlet of the conventional transition duct and the impeller. The first row of vanes may also accelerate the combustion gases to an appropriate speed. Such configurations with conventional transitions and a first row of turbine blades add cost, complexity, and reduce efficiency of the engine. Consequently, there remains room in the art for improvement.

BRIEF DESCRIPTION OF THE DRAWINGS

The invention is explained in the following description in view of the drawings that show:

FIG. 3 shows a cross section along line A-A of FIG. 2.

FIG. 4 shows a close-up of the circled region of FIG. 3.

DETAILED DESCRIPTION OF THE INVENTION

The present inventor has recognized that the advanced transition duct concepts may be applied to a radial inflow gas turbine engine in order to provide a radial inflow engine that may be more compact (shorter), more efficient, and may cost less than conventional radial inflow engines. Advanced transition ducts applied to a radial inflow may be oriented radially, and within the radial plane may also be oriented such that the gas flow axis is also tangential to an impingement surface of the turbine blade at some point in the blade's rotation about a central axis of the gas turbine engine. Proper orientation of a flow of the combustion gases is a result of a geometry that is configured to create a straight axis for each combustion gas flow from a point of ignition until exiting the transition duct immediately prior to impinging the first row turbine blades. The combustion gas flow path is narrowed at an acceleration geometry portion along the straight axis. This narrowing accelerates the gas flow to a speed appropriate for delivery to the first row of turbine blades, without the need for any stationary vane in the flow path. A collimating geometry may be disposed between the accelerating geometry and an outlet of the advanced transition duct. The collimating geometry produces a uniform gas flow such that an entire volume of the gas flow is flowing parallel to the gas flow axis. As a result of this radial orientation, the engine may be shorter along its central axis. This allows the compressor to be closer to the turbine, which reduces rotor dynamics and shaft vibration problems incurred by relatively longer shafts of the prior art. A shorter shaft length, which allows the bearings to be closer together, is especially important with a radial inflow engine with a single impellor turbine. In such an engine the impellor is typically heavy. This necessitates a heavier shaft, which is even more susceptible to the rotor dynamics and vibration problems. Eliminating the first row of turbine vanes may also greatly reduce the cost of the turbine system of the engine, and efficiency losses associated with the first row vanes.

Figure 1:
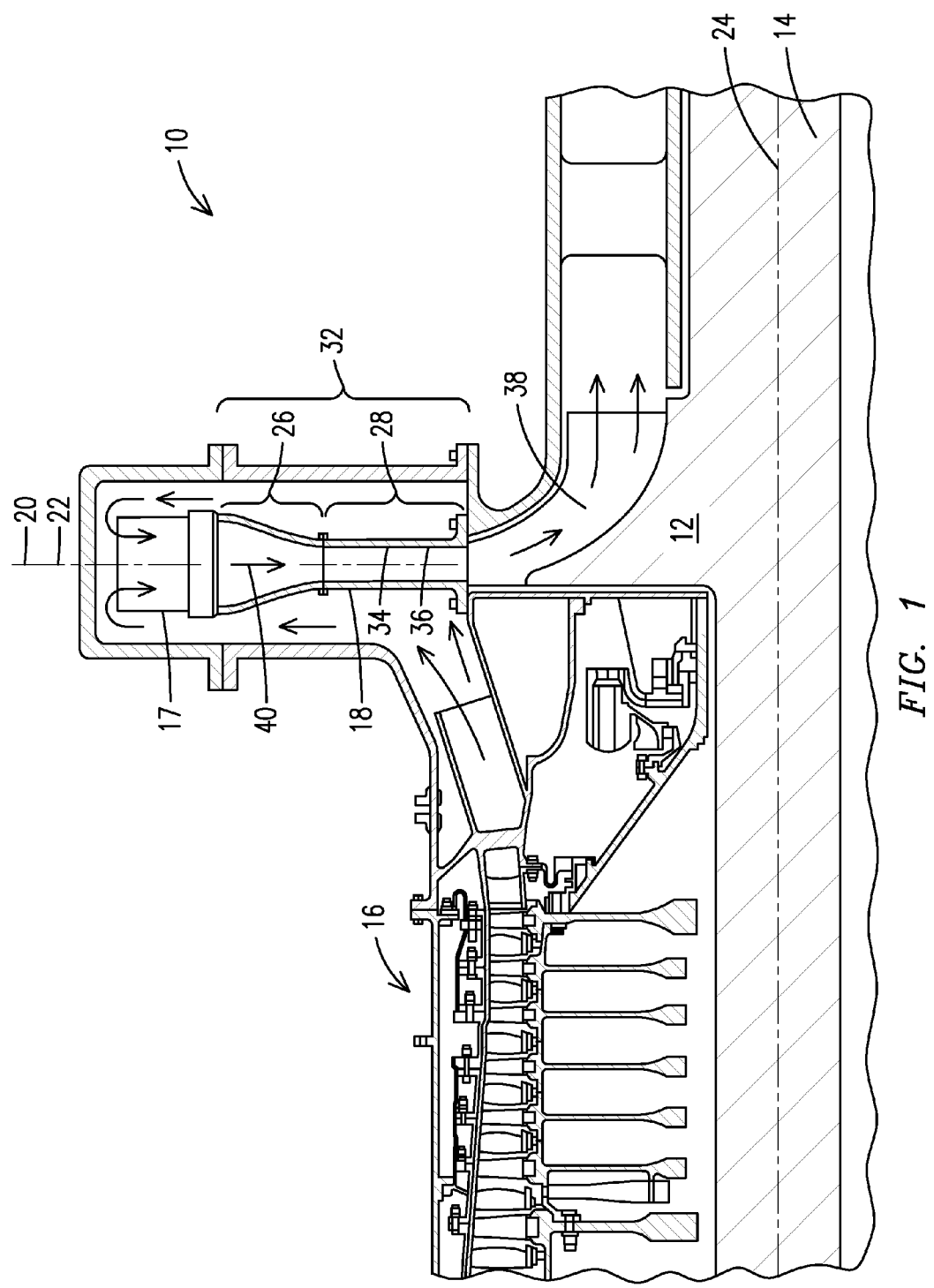
FIG. 1 shows a radial inflow gas turbine engine with advanced transition ducts.

FIG. 1 depicts a radial inflow gas turbine engine 10 with a single impellor 12, a rotor shaft 14, a compressor 16 (an axial compressor is shown but a radial compressor is also envisioned), a combustor 17 and an associated advanced transition duct 18. Each advanced transition duct 18 includes a gas flow axis 20 that is straight and disposed in a plane 22 that is perpendicular to a central axis 24 of the gas turbine engine 10. Each advanced transition duct 18 may have an accelerating geometry 26 and a collimating geometry 28. The accelerating geometry 26 may resemble a cone that decreases a size of cross sections of a flow path 32 in a downstream direction with respect to a direction of flow of the combustion gases within the advanced transition duct 18. It is visible that the accelerating geometry narrows at least in a direction corresponding to the central axis 24.

A plurality of advanced transition ducts 18 form an array (not shown), and inner surfaces 34 of the array form each flow path 32. As used herein the term "inner" refers to surfaces in contact with combustion gases 40. Each flow path 32 may be defined by inner surfaces 36 of a single advanced transition duct 18, or a plurality of advanced transition ducts 18 working in conjunction. For example, a first advanced transition duct 18 may form part of a flow path 32, and an upstream and or downstream adjacent (with respect to a direction of travel of the impellor 12 and impellor blades 38) advanced transition duct (not shown) may form a remainder of the flow path 32. Combustion gases 40 flow along the gas flow axis 20, are accelerated in the accelerating geometry 26 to a speed appropriate for deliver to the impellor blades 38, and may be properly oriented in the collimating geometry 28. Combustion gases 40 impinge the impellor blades 38, and the impellor blades 38 in turn reorient the combustion gases 40 from a radial flow direction to an axial flow direction.

Figure 2:
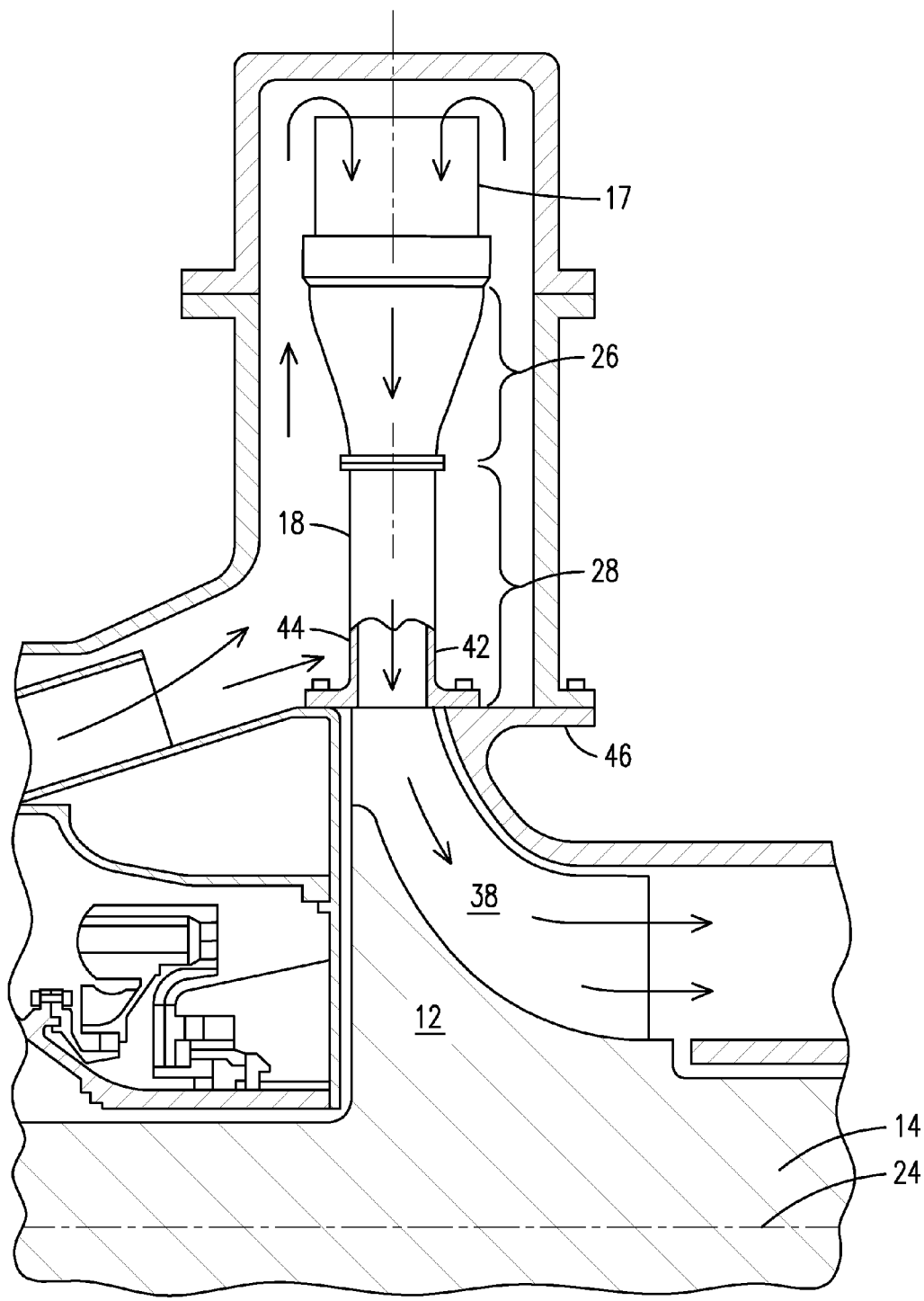
FIG. 2 shows a close-up of the radial inflow gas turbine engine of FIG. 1.

As shown in FIG. 2, each advanced transition duct 18 may be secured on either an advanced transition duct aft side 42 or an advanced transition duct fore side 44. In the embodiment shown the advanced transition duct aft side 42 is secured to the engine turbine section casing 46. Securing the advanced transition duct 18 on only one side or the other side minimizes or avoids thermal fright between forward and aft mounts. Also shown in greater detail are the accelerating geometry 26 and the collimating geometry 28.

FIG. 3 depicts a partial cross section A-A of the engine 10 at the perpendicular plane 22 in which the gas flow axes 20 lie. A portion of the array 50 of advanced transition ducts 18 is visible. In this drawing a reference advanced transition duct 52 is circumferentially adjacent an upstream adjacent advanced transition duct 54. The reference advanced transition duct 52 is also circumferentially adjacent a downstream adjacent advanced transition duct 56. Upstream and downstream as used with adjacent advanced transition ducts is with respect to a direction of rotation 58 of the impellor 12 and impellor blades 38. In the embodiment shown the reference advanced transition duct 52 comprises a reference duct inner surface 60. The upstream adjacent advanced transition duct 54 has an upstream duct inner surface 62, and the downstream adjacent advanced transition duct 56 has a downstream duct inner surface 64.

Generally associated with each advanced transition duct 18 is a flow path 32. However, each flow path 32 may be defined by inner surfaces of one or more than one advanced transition duct. In the embodiment shown, a reference flow path 66 is defined by the reference duct inner surface 60 as well as by the downstream duct inner surface 64. Likewise, an upstream adjacent flow path 68 is defined by the upstream duct inner surface 62 and the reference duct inner surface 60. The downstream adjacent flow path 70 is defined by the downstream duct inner surface 64 and an inner surface of an advanced transition duct disposed adjacent and downstream thereof.

It can be seen that in this embodiment the accelerating region 26 also narrows in a circumferential direction. Narrowing the both the axial and circumferential direction enables a significant acceleration of the combustion gases 40 and eliminates the need for the first row of turbine vanes. In each advanced transition duct 18 there is also a collimating geometry 28. In this region the flow path 32 is fully bounded by the reference duct inner surface 60, although more than once surface could define the collimating geometry 28. Also in the depicted embodiment in each flow path 32 is a partially bounded region 72 where the combustion gases 40 are only partially bounded by the reference duct inner surface 60 and the downstream duct inner surface 64. The collimating geometry 28 is upstream with respect to the flow of combustion gases 40 of the partially bounded region 72 because a partially bounded flow may diverge to a much greater degree if an entire volume of the flow is not flowing parallel to the gas flow axis 20. However, since the entire volume of the flow is flowing parallel to the gas flow axis 20 after collimation, the flow will retain its cross sectional shape further downstream after exiting a flow path outlet 74 while traveling toward the impellor 12. As a result of this tighter control of the combustion gases 40, more the combustion gases 40 will impinge the impellor blades 38 in the manner desired to transfer the most energy, and thus the engine will operate more efficiently.

The flow path outlet 74 may be contoured circumferentially to match a profile made by a sweep 76 of a radially outward most point of the impellor blade tips 78. The flow path outlet 74 may further be contoured along the central axis 24 to match an axial profile of the impellor blade tips 78.

In the embodiment shown an upstream side 80 of the reference flow path 66 is adjacent a downstream side 82 of the upstream adjacent flow path 68. These adjacent sides 80, 82 meet at a common geometry 84. In this embodiment the common geometry 84 may form an edge that may be aerodynamically sharp. Aerodynamically sharp as used herein refers to a geometry that eliminates, or reduces to a negligible amount, a volume between the adjacent gas flow paths 66, 68, where a wake of combustion gases 40 may form turbulence. An aerodynamically blunt geometry on the other hand may be a rounded corner, which would allow turbulence to occur between adjacent gas flow paths 66, 68. Advantageously, an aerodynamically sharp geometry also enables a gap 86 to be minimized. Minimizing gap 86 directs the combustion gases 40 directly onto the impellor blades 38 almost immediately after the combustion gases 40 exit the flow path outlet 74, reducing energy losses associate with longer travel distances. Further, since the reference flow path 66 and the upstream adjacent flow path 68 are at an angle with respect to each other, they converge on each other. Shortening the distance to the impellor blades 38 decreases the amount that the adjacent combustion gas flows converge and therefore interfere with each other, which again increases aerodynamic efficiency.

FIG. 4 is a close-up of the common geometry 84 that forms an edge. In this embodiment it is also in this region that adjacent advanced transition ducts 18 secure to each via interlocking geometry 88. It is this securing that locks the individual adjacent advanced transition ducts 18 into the array 50. The reference advanced transition duct 52 includes a hook geometry 90 and the upstream adjacent advanced transition duct 54 includes a hook receiving geometry 92. The reference duct inner surface 60 meets the upstream duct inner surface 62 at an inner surface joint 94. In this embodiment the inner surface joint 94 is disposed within the partially bounded region 72, and consequently it is beneficial that the inner surface joint 94 be aerodynamically smooth, since a partially bound flow is more susceptible to perturbations. As used herein an aerodynamically smooth joint adds no flow disturbances (e.g. eddies and vortices), or a negligible amount, to the combustion gases 40 flowing over the inner surface joint 94. Optimally the inner surface joint 94 would maintain a laminar flow within the combustion gases 40.

The application of an advanced transition duct to a radial inflow gas turbine engine, and the novel and innovative structure required to accomplish this, enable advanced technology to be used within existing technology engine frames. As a result, more compact, simpler, more efficient, and less expensive radial inflow gas turbine engines may be achieved. Consequently, this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A gas turbine engine, comprising:
a turbine comprising radial inflow impellor blades; and
an array of transition combustor assemblies arranged circumferentially about the radial inflow impellor blades and comprising inner surfaces that are adjacent to combustion gases, wherein the inner surfaces of the array are configured to accelerate and orient, for delivery directly onto the radial inflow impellor blades, a plurality of discrete flows of the combustion gases;
wherein the array inner surfaces define respective combustion gas flow axes, wherein each combustion gas flow axis is straight from a point of ignition until reaching the radial inflow impellor blades, and wherein each combustion gas flow axis intersects a unique location on a circumference defined by a sweep of the radial inflow impellor blades.

2. The gas turbine engine of claim 1, wherein the array inner surfaces define a collimating length in each transition combustor assembly effective to collimate the combustion gases downstream of an acceleration region with respect to the respective combustion gas flow axis.

3. The gas turbine engine of claim 1, wherein cross sections of an inner surface of a respective transition combustor assembly, taken perpendicular to a longitudinal axis of the respective transition combustor assembly, narrow in a downstream direction with respect to a gas turbine engine longitudinal axis, and this narrowing is at least in part effective to accelerate the combustion gases.

4. The gas turbine engine of claim 1, wherein array inner surfaces leading to adjacent sides of adjacent outlets converge to form an aerodynamically sharp edge between the adjacent outlets.

5. The gas turbine engine of claim 1, wherein each transition combustor assembly comprises a geometry at downstream end with respect to a combustion gas flow axis that interlocks with a geometry at a downstream end with respect to a combustion gas flow axis of circumferentially adjacent transition combustor assemblies, thereby interlocking the transition combustor assemblies into the array.

6. The gas turbine engine of claim 4, wherein inner surfaces of two adjacent transition combustor assemblies define each combustion gas flow axis.

7. The gas turbine engine of claim 5, wherein an inner surface of a selected transition combustor assembly and an inner surface of the interlocking downstream end geometry of an adjacent transition combustor assembly define a respective combustion gas flow axis.

8. The gas turbine engine of claim 7, wherein the downstream end geometry of the adjacent transition combustor assembly comprises a hook that secures the adjacent transition combustor assembly to the selected transition combustor assembly.

9. The gas turbine engine of claim 6, comprising an aerodynamically smooth joint where the inner surfaces of two circumferentially adjacent transition combustor assemblies meet.

10. The gas turbine engine of claim 9, wherein the aerodynamically smooth joint is disposed at a location along a respective combustion gas flow longitudinal axis where the array inner surfaces only partially surround the combustion gas flow axis.

11. The gas turbine engine of claim 1, wherein the array is secured at only a forward side or an aft side.

12. The gas turbine engine of claim 11, wherein the aft side of the array is secured to a gas turbine engine casing.

13. A gas turbine engine comprising:
a turbine comprising a plurality of radial inflow impellor blades; and
a combustor assembly comprising a combustor and a transition, the combustor assembly configured to accelerate and orient combustion gases directly onto the radial inflow impellor blades;
wherein the combustion gases travel along an axially straight flow path within the combustor assembly from the combustor until reaching the radial inflow impellor blades.

14. The gas turbine engine of claim 13, wherein each flow path narrows along a respective transition longitudinal axis.

15. The gas turbine engine of claim 14, wherein each flow path comprises:
a fully bounded length immediately downstream of the narrowing with respect to a flow of the combustion gases, wherein a respective flow path is bounded on all sides; and
a partially bounded length downstream of the fully bounded length, wherein a respective flow path transitions from being bounded on all sides at an upstream end to being gradually less bound toward a downstream end.

16. The gas turbine engine of claim 15, wherein a downstream end of a first partially bounded length defines a beginning of an upstream end of a partially bounded length of an adjacent flow path disposed downstream with respect to a direction of rotation of the radial inflow impellor blades.

17. The gas turbine engine of claim 15, wherein each flow path within the partially bounded length comprises aerodynamically smooth walls where bounded.

18. The gas turbine engine of claim 13, wherein an aft side of the combustor assembly is secured to a turbine section casing and a forward side is free to thermally expand and contract with respect to engine components adjacent the forward side.

19. A gas turbine engine, comprising:
a turbine comprising radial inflow impellor blades, wherein a sweep of rotating tips of the impellor blades defines an annular swept shape;
a plurality of advanced transition combustor assemblies arranged circumferentially in an array about the annular swept shape, the array comprising inner surfaces adjacent to combustion gases that define a plurality of combustion gas flow paths, wherein the array inner surfaces are configured to narrow each gas flow path in a downstream direction with respect to a flow of combustion gases therein effective to accelerate the combustion gases for delivery directly to the radial inflow impellor blades, and to define a respective gas flow path longitudinal axis that is straight from a point of ignition of the combustion gases until the combustion gases are not bound by any array inner surface, wherein each gas flow path longitudinal axis is within a plane perpendicular to a gas turbine engine longitudinal axis, and wherein the inner surfaces direct the combustion gasses directly onto the annular swept shape;
wherein each advanced transition combustor assembly comprises an interlocking hook feature at downstream end with respect to the respective gas flow path longitudinal axis that interlocks with an adjacent advanced transition combustor assembly effective to interlock the advanced transition combustor assemblies into the array, wherein an inner surface of the interlocking hook feature and an inner surface of the adjacent advanced transition combustor assembly define a respective combustion gas flow path, and
wherein an aft side of the array is secured to a turbine section casing and a forward side is free to thermally expand and contract with respect to engine components adjacent the forward side.

* * * * *